(12) United States Patent
Wright et al.

(10) Patent No.: US 11,595,790 B2
(45) Date of Patent: *Feb. 28, 2023

(54) CONTENT-BASED ROUTING AND RATING OF MESSAGES IN A TELECOMMUNICATIONS NETWORK

(71) Applicant: Inteliquent, Inc., Chicago, IL (US)

(72) Inventors: Chris Wright, Tampa, FL (US); Lyle Pratt, Cedar Park, TX (US)

(73) Assignee: Inteliquent, Inc., Chicago, IL (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/063,431

(22) Filed: Oct. 5, 2020

(65) Prior Publication Data

US 2021/0112381 A1   Apr. 15, 2021

Related U.S. Application Data

(63) Continuation of application No. 15/994,644, filed on May 31, 2018, now Pat. No. 10,798,534.

(60) Provisional application No. 62/513,241, filed on May 31, 2017.

(51) Int. Cl.
| | |
|---|---|
| *H04W 4/00* | (2018.01) |
| *H04W 4/12* | (2009.01) |
| *H04L 45/302* | (2022.01) |
| *G06F 40/30* | (2020.01) |
| *H04L 67/63* | (2022.01) |
| *H04M 15/00* | (2006.01) |
| *H04W 4/24* | (2018.01) |

(52) U.S. Cl.
CPC .............. *H04W 4/12* (2013.01); *G06F 40/30* (2020.01); *H04L 45/306* (2013.01); *H04L 67/63* (2022.05); *H04M 15/8088* (2013.01); *H04M 15/8221* (2013.01); *H04W 4/24* (2013.01); *H04M 2203/158* (2013.01); *H04M 2215/22* (2013.01); *H04M 2215/32* (2013.01); *H04M 2215/7826* (2013.01)

(58) Field of Classification Search
CPC ........... H04W 4/12; H04W 4/24; G06F 40/30; H04L 67/63; H04L 45/306; H04M 15/8088; H04M 15/8221; H04M 2203/158; H04M 2215/22; H04M 2215/32; H04M 2215/7826
See application file for complete search history.

(56) References Cited

U.S. PATENT DOCUMENTS

| | | | |
|---|---|---|---|
| 7,620,407 B1 | 11/2009 | Donald et al. | |
| 8,255,948 B1 * | 8/2012 | Black | H04N 21/812 |
| | | | 725/35 |
| 8,478,054 B2 * | 7/2013 | Sun | G06F 16/353 |
| | | | 382/168 |
| 9,552,548 B1 * | 1/2017 | Brestoff | G06F 16/35 |
| 10,108,674 B1 * | 10/2018 | Kolcz | H04L 51/52 |

(Continued)

FOREIGN PATENT DOCUMENTS

EP    1850572    10/2007

OTHER PUBLICATIONS

International Search Report and Written Opinion for PCT/US2018/035430 dated Sep. 10, 2018.

*Primary Examiner* — Khai M Nguyen
(74) *Attorney, Agent, or Firm* — Neal, Gerber & Eisenberg LLP

(57) ABSTRACT

Systems and methods for automated routing and rating of communication data.

20 Claims, 4 Drawing Sheets

(56) References Cited

U.S. PATENT DOCUMENTS

| | | | |
|---|---|---|---|
| 2004/0109455 A1* | 6/2004 | Jouppi | H04W 28/24 |
| | | | 370/395.21 |
| 2005/0203673 A1 | 9/2005 | El-Hajj et al. | |
| 2010/0015956 A1 | 1/2010 | Qu et al. | |
| 2010/0145900 A1 | 6/2010 | Zheng et al. | |
| 2012/0303624 A1 | 11/2012 | Gandhi et al. | |
| 2013/0308767 A1 | 11/2013 | Manley et al. | |
| 2014/0250506 A1 | 9/2014 | Hallam-Baker | |
| 2016/0149849 A1 | 5/2016 | Lukacs et al. | |
| 2016/0248724 A1 | 8/2016 | Chen et al. | |
| 2017/0061294 A1* | 3/2017 | Weston | G06F 16/334 |
| 2017/0180303 A1 | 6/2017 | Debris et al. | |
| 2017/0302618 A1 | 10/2017 | Porika | |
| 2018/0352391 A1* | 12/2018 | Wright | H04L 67/63 |
| 2021/0352175 A1* | 11/2021 | Nelson | H04Q 3/0045 |
| 2022/0014543 A1* | 1/2022 | Jakobsson | H04L 63/1425 |

\* cited by examiner

| Service Category / Classification | Example Message |
|---|---|
| Marketing Promotion | Happy Birthday! Collect yr Birthday Treats letter from Customer Service to enjoy exclusive privileges |
| Marketing Notification | <HAILO> BIG THANK YOU to all taxi drivers who helped make our launch so successful! We were in ALL the newspapers |
| Two-Factor Authentication | Usar ***** como codigo de seguridad de la cuenta Microsoft |
| Two-Factor Authentication | Your single-use eBay PIN is **** |
| Service Notification | sony repair center:your sony product is shipping today,please allow 1-2 working days. |
| Financial Notification | There was a cash withdrawal of $1,000.00 with your DBS/POSB card ending **** on 01 Jan at 09:12. If you did not effect this, please call 1800 111 1111. |
| Financial Validation | Fr DBS iB: Use ****** (iBanking OTP) to complete your iBanking transaction. Sent on 01 Nov 13:25. |
| Marketing Interaction | Wilson & Muir 90$ Survey. Take our quick survey and we will reward you with 90$ http://ec-q-sample.space-engine.com/products |
| Marketing Lead Generation | You can sign up for the $17 Legal Shield plan on my website today at willielove.legalshieldassociate.com and be protected proactive and not reactive! |
| Service Activation | Your Uber account verification number is: ****. Enter this in our app to confirm your Uber account. |
| Service Invitations | hey, i just sent you a photo. click the link to view my photo before it expires |
| Spam | What is the present Condition of your----------->>>2005 Kawasaki ZX10R Ninja - $ 6500 (McMinnville) (1/3)thanks for your reply,can you assure me that it's in good state and that i will not be disappointed with it.I'm ready to pay your asking price and to |

FIG. 2

CONTENT-BASED ROUTING AND RATING OF MESSAGES IN A TELECOMMUNICATIONS NETWORK

CROSS-REFERENCE

This application is a continuation of U.S. patent application Ser. No. 15/994,644, filed on May 31, 2018, now U.S. Pat. No. 10,798,534, which claims priority to U.S. Provisional Patent App. No. 62/513,241, filed on May 31, 2017. The contents of each application are incorporated herein by reference in their entirety.

TECHNICAL FIELD

This disclosure relates to the field of telecommunications, and more particularly, to routing and rating messages based on determined classes.

BACKGROUND

Telecommunications carriers, intercarrier providers, content providers, retail services providers, and other stakeholders (sometimes collectively referred to herein as carriers or service providers) currently face many challenges affecting revenues and operational costs. A particular challenge exists with respect to the routing and rating of messages. Some carriers may only wish to allow messages of certain classes to be transmitted. Further, carriers may rate messages differently based on class. But improper or misclassified messages can cause carriers to lose messages, transmit messages improperly, and lose revenue. Improper and misclassified messages also create the potential for undesirable messaging reaching end users, and may also create data security and privacy concerns.

Existing network architecture does not provide carriers the ability to adequately account for mislabeled, misclassified, or misidentified messages when rating the messages. Nor does it provide the ability to monitor and verify message classification on a scale present in today's communications environment.

The invention(s) described herein is/are directed, but not limited, to addressing these and other issues associated with existing systems and methods. Other aspects and benefits not related to these issues are contemplated as well.

SUMMARY

Systems and methods for automatic routing and rating of messages are provided. According to a particular and non-limiting aspect, an example system may include a computing device configured to receive from a source element, a message destined for a telecommunications network entity, such as a commercial mobile radio service (CMRS) entity, wherein the message comprises a service category. The service category may be a predetermined category decided by the source element, defining the content, purpose, or other characteristic of the message. The service category may be arbitrarily set, and may not be related to the actual or true classification of the message.

The computing device may receive the message, and may determine whether or not to classify the message. Some messages may not require classification, such as those sent by a trusted source. These messages may be passed on to their appropriate destinations.

Messages that do require classification, however, may be classified by the computing device. The computing device may apply a deep learning algorithm to the message to determine the class. The deep learning algorithm may be generated, created, or determined by receiving and analyzing many messages (e.g., thousands, millions, or more). The deep learning algorithm may run an iterative process to update, modify, or otherwise adapt, considering each message payload, contents, source, destination, time stamps associated with one or more aspects of the message transmission, and other message characteristics.

After determining the message class, the computing device may compare the message class to the service category (if any) provided by the source element. This comparison may allow the computing device to determine whether the message was mislabeled, which can affect a trustworthiness rating of the source element.

The computing device may then determine a rating for the message, and deliver the message to the destination.

The process described above (and elsewhere in this disclosure) may be performed for many messages over a period of time, such that a trustworthiness of a given source element can be determined and updated. In turn, the rating applied to one or more messages may be modified based on a trustworthiness of the source element of the particular message, such that untrustworthy source elements may have a rating multiplier applied to their messages. Other actions can be taken as well.

Further, some embodiments may be described herein as including receiving a message, classifying a message, rating a message, and delivering a message. But other embodiments may include fewer ore more steps, such as including receiving, classifying and rating a message (i.e., without delivering the message). Other combinations of steps, functions, and actions are contemplated as well.

These and other aspects will become readily apparent from the written specification, drawings, and claims provided herein.

BRIEF DESCRIPTION OF DRAWINGS

FIG. 2 illustrates example messages, service categories, and classifications according to embodiments of the present disclosure.

DETAILED DESCRIPTION OF EXEMPLARY EMBODIMENTS

Figure 1:
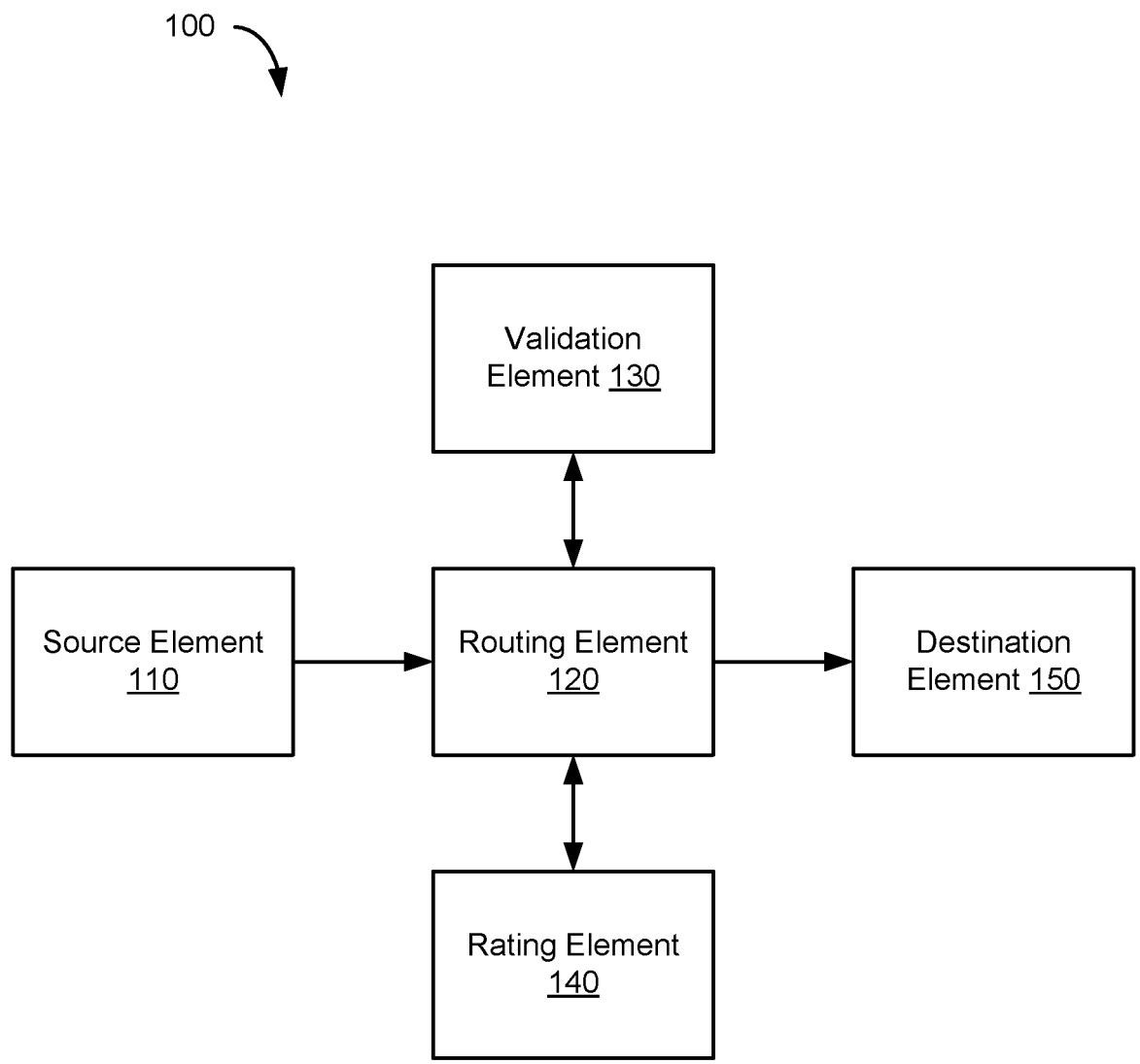
FIG. 1 is a schematic diagram of an example system according to embodiments of the present disclosure.

The description that follows describes, illustrates and exemplifies one or more particular embodiments of the invention(s) in accordance with its principles. This description is not provided to limit the invention(s) to the embodiments described herein, but rather to explain and teach the principles of the invention(s) in such a way to enable one of ordinary skill in the art to understand these principles and, with that understanding, be able to apply them to practice not only the embodiments described herein, but also other embodiments that may come to mind in accordance with these principles. The scope of the invention(s) is/are intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates the didactic purpose of the specification. Additionally, the drawings set forth herein are not necessarily drawn to scale, and in some instances proportions may have been exaggerated to more clearly depict certain features. Such labeling and drawing practices do not necessarily implicate an underlying substantive purpose. Furthermore, one or more drawings herein may be of a purely functional schematic nature, or a combination of a functional and structural/hardware schematic nature, intended to disclose and teach functional aspects of the subject matter without necessarily limiting the disclosure to any specific structure/hardware. As stated above, the present specification is intended to be taken as a whole and interpreted in accordance with the principles of the invention(s) as taught herein and understood to one of ordinary skill in the art.

With respect to the exemplary systems, components and architecture described and illustrated herein, it should also be understood that the invention(s) may be embodied by, or employed in, numerous configurations and components, including one or more system, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system. Furthermore, although one or more systems, devices, apparatuses, and other components may be described, all methods, systems, and articles of manufacture consistent with known architecture for these components are intended to be encompassed. For example, a processor may be implemented as part of one or more components as a microprocessor, microcontroller, application specific integrated circuit (ASIC), discrete logic, or a combination of other type of circuits or logic. Similarly, memories as part of one or more of these components may be DRAM, SRAM, Flash or any other type of memory. Flags, data, databases, tables, and other data structures may be separately stored and managed, may be incorporated into a single memory or database, may be distributed, or may be logically and physically organized in many different ways. Software programs, which may be described in terms of one or more code segments, may be parts of a single program, separate programs, or distributed across several memories and processors. The methods and functionality described herein may be implemented via hardware, software, and/or firmware, and processed by one or more processor-based systems, components or devices. Such methods and functionality may be described as a module or engine with the understanding that its implementation is not limited to any particular hardware, software, firmware, or device configuration, but rather encompassing all implementations/embodiments within the skill of one of ordinary skill in the art. Systems may be implemented in hardware, software, or a combination of hardware and software in one processing system or distributed across multiple processing systems. Accordingly, the invention(s) should not be construed as limited by the exemplary embodiments described herein or any of the associated didactic schematics.

The systems and associated methods described herein facilitate automatic routing and rating of messages. Over-The-Top (OTT) telecommunications entities (as well as other entities such as marketing, business, or other Application to Person (A2P) based entities) often desire to deliver messaging traffic to the subscriber base of one or more carriers. Carriers may route and/or rate messages based on their content, such as by charging more for advertising messages than for ordinary person-to-person communications. Further, carriers may wish to prevent certain classes of messages from being transmitted to their destinations at all, such as spam, or other messages associated with risk of fraud, malware or breach of data privacy/security.

Some communication structures may use a message service category to route and rate messages. This service category may be assigned by the source element (i.e., the OTT entity), and may thus not always be accurate. OTT entities may be incentivized to classify messages in service categories that cost less and/or will not be flagged as spam or otherwise prevented from reaching their destination.

Embodiments of the present disclosure may enable one or more parties to independently determine the message classification, such that the appropriate routing and rating may occur. Further, based on the independent classification, source elements or OTT entities can be deemed trustworthy or not, and may be given an associated ranking, grade, or other score based on the accuracy with which they label the service categories of messages. This ranking may then determine a rating multiplier, such that messages sourced from untrustworthy source elements are charged more than those from trusted source elements.

Thus, embodiments described herein may enable carriers to appropriately classify or reconcile the originator categorization of messages, to avoid revenue leakage due to under charging or under-rating messages, and to avoid transmitting unauthorized or unwanted messages to destination elements (consumers).

FIG. 1 illustrates an exemplary, non-limiting embodiment of a system 100 according to embodiments of the present disclosure. System 100 may include source element 110, routing element 120, validation element 130, rating element 140, and destination element 150. One or more of the elements of system 100 may part of a computing system or computing device, such as the computing device described with respect to FIG. 3.

Source element 110 may be a message source, configured to generate, originate, or otherwise create one or more messages to be transmitted to destination element 150 via one or more network paths. In some examples, source element 110 may be any OTT entity, such as Twillio, Bandwidth, MessageBird, Plivo, and other communication entities. Source element 110 may be any non-CMRS (commercial mobile radio service) entity.

Source element 110 (e.g., an OTT entity) may desire to transmit a message to one or more destination elements 150. Destination element 150 may include any CMRS entity, including the subscriber bases of entities such as AT&T, Verizon, Sprint, T-Mobile, Vodafone, and others. These entities may provide a network path to their subscribers over which the OTT entities wish to communicate. Destination element 150 may also be a non-CMRS entity, such as another OTT entity.

In some examples, each message transmitted by source element 110 may have a corresponding time stamp, payload, IP address, source element identity or carrier identity, destination element identity, and/or other characteristics. Further, each message may have a corresponding service category.

In some examples, the source element 110 may supply the service category to each message. This may occur, for instance, by the source element populating the service category in a "tag-length value" or "type-length value" (TLV) of the message. Some messages may take the form of SMPP messages, for which the TLV may be a field. Alternatively, the systems, devices, and methods described herein may be leveraged in connection with any type of communications session, and may involve, without limitation, SMS or SMS like messages, MIMS messages, video calls, video streams, VoIP voice calls, HD VoIP voice calls, VoLTE voice calls, HD VoLTE voice calls, VoWi-Fi voice calls, application push notifications, and the like.

Example message service categories may include (1) person to person (P2P) communication, (2) application to person (A2P) communication, and (3) SPAM. A2P communication may further include or be broken down into (i) notification messages (e.g., marketing, service, or financial), (ii) activation messages (e.g., two-factor authentication and service activation), (iii) validation messages, (iv) marketing messages (e.g., promotions or lead generation messages), and (v) voting or polling messages. Other categories may be included as well. FIG. 2 illustrates example messages and corresponding service categories.

Routing element 120 may be configured to receive the message(s) transmitted by source element 110. Routing element 120 may then be configured to make one or more determinations regarding the message, such as whether or not classification, or reconciliation of the classification of the message is required.

Determining that classification is required may include determining whether the message already has a corresponding service category. Where routing element 120 receives a message without a corresponding service category, routing element 120 may determine that classification of the message is required. Further, even where the message already has a corresponding service category, routing element 120 may still determine that classification of the message is required.

Determining whether to classify the message may be done based on the source connection, source telecommunications network, or other characteristics of the message and/or source of the message.

If classification is not required, the message may be passed along to the appropriate destination element 150. However, if classification is required, the message (and/or information, data, or other characteristics of the message) may be transmitted to the validation element 130.

Validation element 130 may receive messages, message data, or other message characteristics from routing element 120. Validation element 130 may also perform an analysis of the message, and transmit a classification of the message back to routing element 130.

In some examples, validation element 130 may evaluate the received message based on one or more characteristics, such as the message payload (i.e., contents), source address, destination address, and/or time stamps associated the message. Then, based on a deep learning algorithm, validation element 130 may determine a classification of the message. The classification may include one or more of the same categories described above with reference to the service category, with examples shown in FIG. 2.

In some examples, the deep learning algorithm may be an algorithm determined initially by feeding a plurality of messages, service categories, classifications, and other associated information into an algorithmic process. It may then involve processing the messages, and iteratively updating the algorithm.

The deep learning algorithm may include leveraging Word2Vec modeling to increase classification accuracy and speed via word clustering. Word2Vec modeling may include converting each word or group of words of a message into vectors which can be added, subtracted, or otherwise manipulated in vector space.

The deep learning algorithm may also leverage algorithms and decision making structures configured to process images, sounds, videos, and other types of messages in addition to text, such as those described herein.

The classification of a given message may be determined based on the deep learning algorithm and various message characteristics such as the payload, time stamp, source address, destination address, source element identity, destination element identity, and other factors. For instance, the message payload may play a central role in determining the message classification. The payload, or contents, of the message may inform the purpose of the message. Further, when a plurality of messages are analyzed, the payload of all the messages may be analyzed to determine patterns and how the patterns change over time. This can be useful in determining a classification for a particular message.

One or more time stamps associated with the message can relate to a point in time at which the message was sent, the point(s) in time at which the message reached various nodes or intermediate points along its route, and the message "velocity." A message velocity may refer to the speed at which a particular source entity is sending messages. For instance, the velocity may be higher for a first source entity sending more messages in a given time period than a second source entity that only sends a few. The message corresponding to the first source entity may thus have a corresponding high velocity. Messages with a high velocity, or velocity greater than a certain threshold, may be deemed SPAM or categorized as A2P messages. The time stamps of many messages may be analyzed together, to provide additional information about groups of messages and/or particular source elements. For instance, a given source element may transmit many hundreds or thousands of messages at nearly the same time, which may be detected and used to classify one or more messages as SPAM or types of A2P messaging.

Similarly, a message source address can inform whether the message is SPAM or some other classification. A message sent from a given source element notorious for sending SPAM may be classified as SPAM more readily, or may be more heavily scrutinized or otherwise analyzed differently than a message from a trusted source element. As, the identity of the source element can play an important role in determining the classification for a given message. The deep learning algorithm may further consider one or more other message characteristics in making the classification.

Once a classification has been made, validation element 130 may transmit the classification to routing element 120. Routing element 120 may then responsively generate and/or transmit a record, such as a call detail record (CDR) to the rating element 140. The CDR may include information corresponding to the message, such as one or more parties involved, various time stamps, identification information, service categories and classifications, a route taken by the message through one or more networks, any fault conditions encountered, and more. In some embodiments, the CDR may be called a Message Detail Record (MDR) or by some other term.

Rating element 140 may be configured to receive the record and responsively assign a rating to the message. The message rating may be based on one or more factors, including the record (e.g., CDR), the service category, the classification, the rating structure determined by the particular carrier network over which the message is being transmitted, the status of the message, type of message, trustworthiness or other grade associated with the source element and/or message, the destination element, and/or various other factors. After a rating is decided, the message may then be transmitted by the routing element 120 to the destination element 150.

Figure 3:
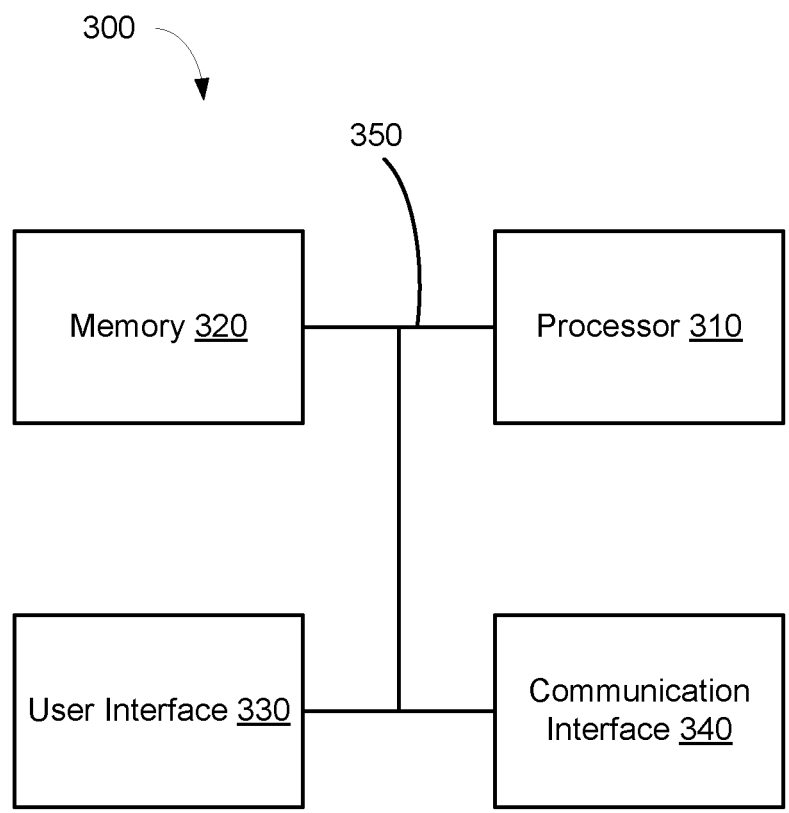
FIG. 3 is a schematic diagram of an exemplary computing device capable of supporting and facilitating one or more aspects described herein.

FIG. 3 illustrates a simplified block diagram of an example computing device 300 according to embodiments of the present disclosure. Computing device 300 may be configured for performing a variety of functions or acts, such as those described in this disclosure (and accompanying drawings). The computing device 300 may include various components, including for example, a processor 310, memory 320, user interface 330, and communication interface 340, all communicatively coupled by system bus, network, or other connection mechanism 350. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein.

Processor 310 may include a general purpose processor (e.g., a microprocessor) and/or a special purpose processor (e.g., a digital signal processor (DSP)). Processor 310 may be any custom made or commercially available processor, such as, for example, a Core series or vPro processor made by Intel Corporation, or a Phenom, Athlon or Sempron processor made by Advanced Micro Devices, Inc. In the case where the computing device 300 is a server, the processor 310 may be, for example, a Xeon or Itanium processor from Intel, or an Opteron-series processor from Advanced Micro Devices, Inc. Processor 310 may also represent multiple parallel or distributed processors working in unison.

Memory 320 may include one or more volatile (e.g., random access memory (RAM, such as DRAM, SRAM, SDRAM, etc.)) and nonvolatile (e.g., ROM, hard drive, flash drive, CDROM, etc.), removable, and/or non-removable storage components, such as magnetic, optical, or flash storage, and may be integrated in whole or in part with the processor 310. These and other components may reside on devices located elsewhere on a network or in a cloud arrangement. Further, the memory 320 may take the form of a non-transitory computer-readable storage medium, having stored thereon program instructions (e.g., compiled or non-compiled program logic and/or machine code) that, when executed by the processor 310, cause the device 300 to perform one or more functions or acts, such as those described in this disclosure. Such program instructions may define or be part of a discrete software application that can be executed in response to certain inputs received from the user interface 330 and/or communication interface 340, for instance. Memory 320 may also store other types of information or data, such as those types described throughout this disclosure.

User interface 330 may facilitate interaction with a user of the device, if applicable. As such, user interface 330 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 330 may also comprise devices that communicate with inputs or outputs, such as a short-range transceiver (RFID, Bluetooth, etc.), a telephonic interface, a cellular communication port, a router, or other types of network communication equipment. The user interface 330 may be internal to the computing device 300, or may be external and connected wirelessly or via connection cable, such as through a universal serial bus port.

Communication interface 340 may be configured to allow the device 300 to communicate with one or more devices (or systems) according to one or more protocols. In one example, the communication interface 340 may be a wired interface, such as an Ethernet interface or a high-definition serial-digital-interface (HD-SDI). As another example, the communication interface 340 may be a wireless interface, such as a cellular or WI-FI interface. In some examples, each of a plurality of computing devices 300 and/or other devices or systems on a network may be configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while some embodiments may include computing device 300 having a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

In the context of this document, a "computer-readable medium" may be any means that can store, communicate, propagate, or transport data objects for use by or in connection with the systems and methods as described herein. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The systems, devices, and methods can be embodied in any type of computer-readable medium for use by or in connection with an instruction execution system or apparatus, such as a computer.

Figure 4:
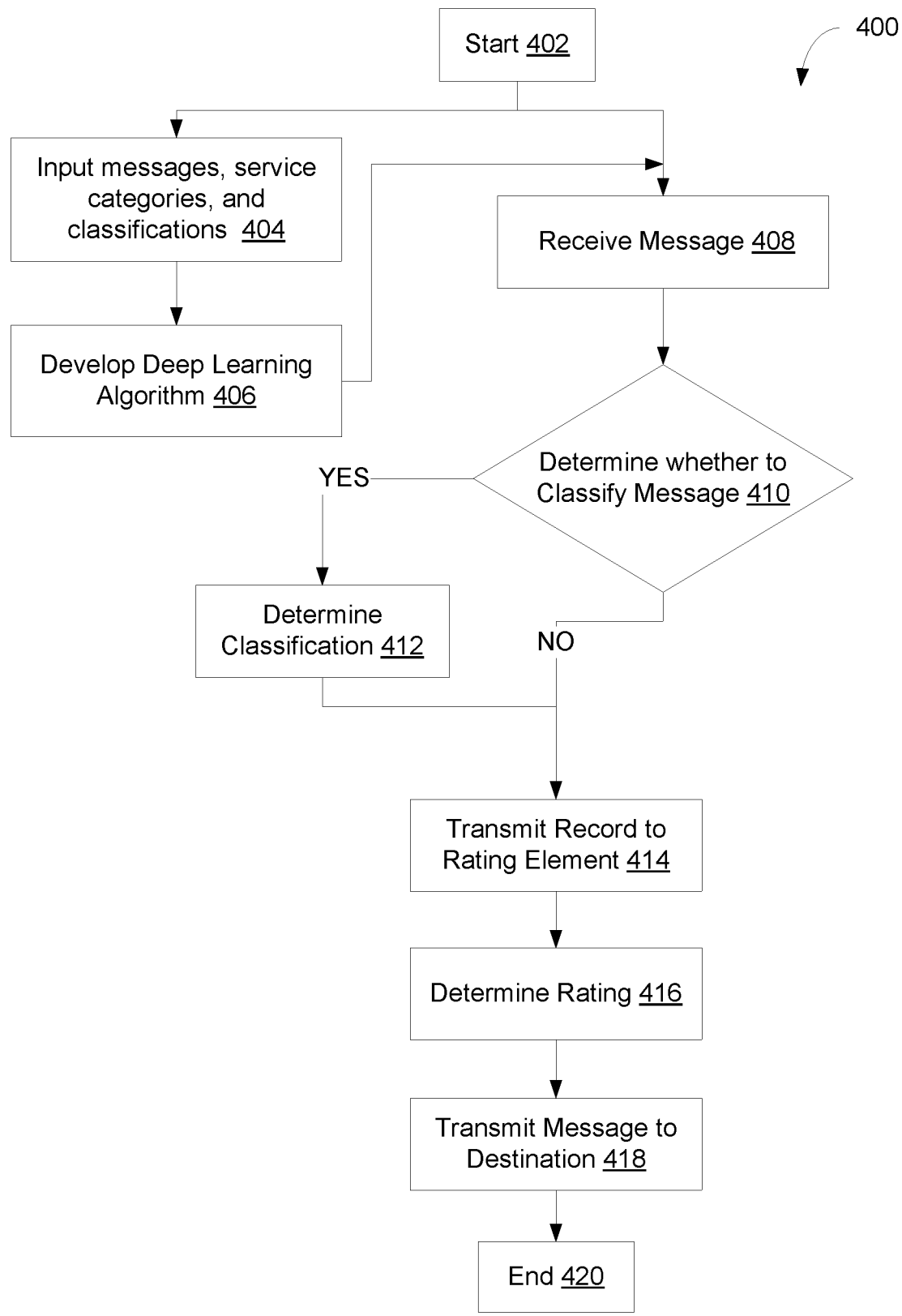
FIG. 4 is a flowchart illustrating an example method according to embodiments of the present disclosure.

FIG. 4 illustrates an example method 400 according to embodiments of the present disclosure. Method 400 may be performed by one or more computing devices or systems, such as computing device 300 described with respect to FIG. 3. The flowchart of FIG. 4 is representative of machine readable instructions that are stored in memory (such as memory 320 of computing device 300) and may include one or more programs which, when executed by a processor (such as processor 310 of computing device 300) may cause one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 400. At block 404, method 400 may include inputting messages, service categories, and/or message classifications to one or more computing devices or systems. Block 406 may then include developing the deep learning algorithm based on the input.

At block 408, method 400 may include receiving a message. The message may be received by a routing element from a source element. The source element may append, add, or otherwise populate a field of the message with a service category describing one or more aspects of the message. At block 410, method 400 may include determining whether or not to classify the received message.

If it is determined to classify the message, method 400 may include block 412 in which the message classification is determined. This determination may be performed based on the deep learning algorithm, which may factor in message characteristics such as the message payload, time stamps, source address and destination address.

And if it is determined to not classify the message, method 400 may proceed to block 414 wherein a record is transmitted to the rating element. The rating element then may determine a rating for the message at block 416. The rating may be determined based on one or more characteristics of the message, including the initial service category (and whether it differs from a determined classification), a source identity and/or source score, ranking, or other evaluation, and/or one or more other factors.

At block 418, method 400 may include transmitting the message to the appropriate destination. Method 400 may then end at block 420.

In some examples, the rating and associated methods described herein can be used in connection with management and financial concerns between various entities. For example, a business rules engine (not shown) may be deployed in a system, which provides the ability for customized configuration of how the system processes and treats content traffic based on ratings and takes into consideration relationships between various networks and carriers. Specific rules attributable to various entities involved, such as carrier(s), content provider(s), or other network(s) can be applied. Clearing and reporting capabilities to facilitate financial settlement of content traffic and delivery are also contemplated.

While one or more specific embodiments have been illustrated and described in connection with the invention(s), it is understood that the invention(s) should not be limited to any single embodiment, but rather construed in breadth and scope in accordance with recitation of the appended claims.

What is claimed is:

1. A system for automated routing and rating of communications data comprising:
a computing device configured to:
receive from a source element, a message destined for a destination element, wherein the message comprises a service category;
determine whether to classify the message;
determine a message class, wherein determining the message class comprises:
applying, to the message, a deep learning algorithm generated based on a plurality of messages each having a payload, time stamp, source address, and destination address; and
determining the message class based on the deep learning algorithm;
compare the service category to the determined message class;
determine a rating for the message based on the comparison; and
deliver the message to the destination element.

2. The system of claim 1, wherein the destination element is associated with a commercial mobile radio service (CMRS) entity.

3. The system of claim 1, wherein the source element is associated with an over-the-top (OTT) entity.

4. The system of claim 1, wherein the deep learning algorithm utilizes at least one of the message payload, time stamp, source address, and destination address associated with the message to determine the message class.

5. The system of claim 1, wherein the deep learning algorithm utilizes a message velocity to determine the message class.

6. The system of claim 1, wherein the message class comprises one of a person to person (P2P) communication; an application to person (A2P) communication; and SPAM.

7. The system of claim 6, wherein the A2P communication comprises one of a notification message; an activation message; a validation message; a marketing message; and a voting message.

8. A system for automated routing and rating of communications data comprising:
a computing device configured to:
receive a message from a source element, wherein the message comprises a service category;
determine whether to classify the message;
determine a message class, wherein determining the message class comprises:
applying, to the message, a deep learning algorithm generated based on a plurality of messages having respective payloads, time stamps, source addresses, and destination addresses; and
determining the message class based on the deep learning algorithm;
compare the service category to the determined message class; and
determine a rating for the message based on the comparison.

9. The system of claim 8, wherein the source element is associated with an over-the-top (OTT) entity.

10. The system of claim 8, wherein the deep learning algorithm utilizes at least one of the message payload, time stamp, source address, and destination address associated with the message to determine the message class.

11. The system of claim 8, wherein the deep learning algorithm utilizes a message velocity to determine the message class.

12. The system of claim 8, wherein the message class comprises one of a person to person (P2P) communication; an application to person (A2P) communication; and SPAM.

13. The system of claim 12, wherein the A2P communication comprises one of a notification message; an activation message; a validation message; a marketing message; and a voting message.

14. The system of claim 8, wherein the rating comprises a numerical value.

15. The system of claim 8, wherein the rating is determined based on a comparison of one or more of an initial service category; a source identity; a source score; and a ranking.

16. A method for automated routing and rating of communications data via a computing device within a telecommunications network, the method comprising the steps of:
    at the computing device, receiving from a source element, a message destined for a destination element, wherein the message comprises a service category;
    determining at the computing device whether to classify the message;
    determining at the computing device a message class, wherein determining the message class comprises:
        applying, to the message, a deep learning algorithm generated based on a plurality of messages each having a payload, time stamp, source address, and destination address; and
        determining the message class based on the deep learning algorithm;
    comparing at the computing device the service category to the determined message class;
    determining at the computing device a rating for the message based on the comparison; and
    delivering the message to the destination element.

17. The method of claim 16, wherein the destination element is associated with a commercial mobile radio service (CMRS) entity.

18. The method of claim 16, wherein the source element is associated with an over-the-top (OTT) entity.

19. The method of claim 16, wherein the deep learning algorithm utilizes at least one of the message payload, time stamp, source address, and destination address associated with the message to determine the message class.

20. The method of claim 16, wherein the deep learning algorithm utilizes a message velocity to determine the message class.

* * * * *

UNITED STATES PATENT AND TRADEMARK OFFICE
CERTIFICATE OF CORRECTION

| | |
|---|---|
| PATENT NO. | : 11,595,790 B2 |
| APPLICATION NO. | : 17/063431 |
| DATED | : February 28, 2023 |
| INVENTOR(S) | : Chris Wright et al. |

It is certified that error appears in the above-identified patent and that said Letters Patent is hereby corrected as shown below:

In the Specification

Column 5, Line 8, "MIMS messages" should be changed to --MMS messages--.

Signed and Sealed this
Twenty-third Day of April, 2024

Katherine Kelly Vidal
*Director of the United States Patent and Trademark Office*